F. W. KUPKE.
SELF TIGHTENING CHUCK.
APPLICATION FILED JULY 16, 1910.

1,043,114.

Patented Nov. 5, 1912.

Witnesses:
Grey M. Hessler.
Thomas Donnellan

Inventor
Friedrich W. Kupke,
by L. K. Böhm,
Attorney.

UNITED STATES PATENT OFFICE.

FRIEDRICH W. KUPKE, OF GERA, GERMANY.

SELF-TIGHTENING CHUCK.

1,043,114.　　　Specification of Letters Patent.　　Patented Nov. 5, 1912.

Application filed July 16, 1910. Serial No. 572,284.

*To all whom it may concern:*

Be it known that I, FRIEDRICH W. KUPKE, a citizen of the German Empire, and a resident of Gera, Germany, have invented certain new and useful Improvements in Self-Tightening Chucks, of which the following is a specification.

The present invention has reference to improvements in self-centering chucks whose jaws may be set by hand or drawn tight by the working resistance and may again be released by hand.

The novel chuck comprises a ball bearing located between the tightening sleeve and the chuck body whereby the friction between said sleeve and the chuck body is lessened which friction is caused by the working resistance and opposes the self tightening of the chuck.

Figure 1:
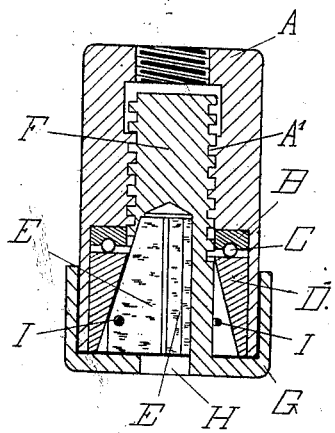
Figure 3:
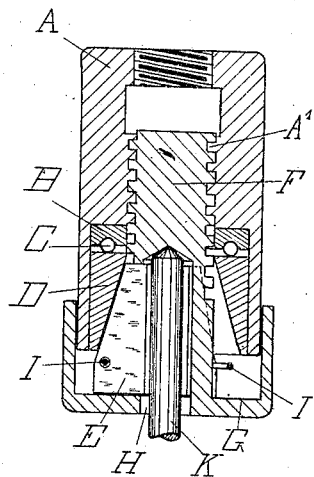
Figure 2:
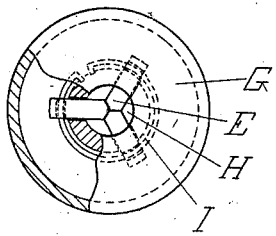
Figure 4:
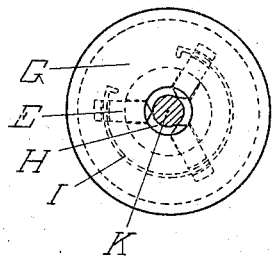

The invention is illustrated in the accompanying drawing in which:

Figure 1 represents in sectional elevation a closed self-centering chuck which embodies in desirable form the present improvements. Fig. 2 shows same in bottom plan view partly broken away. Fig. 3 illustrates in sectional elevation the open chuck and Fig. 4 is a bottom plan view of Fig. 3.

The chuck body A is cylindrically bored out and provided with a right-handed thread $A^1$ in the narrow portion of the boring. A cap G serves as a support for the jaws E and overlaps part of the chuck body in the manner of an overlapping nut. The cap G forms inside a threaded bolt F which fits axially into the chuck body and may be screwed in the threaded portion of same. Centrally a boring H is produced in the bolt F extending from its free or outer end inwardly. The boring H permits of the introduction of tools of various diameters. The jaws E which are supported by the cap G also reach into the boring H and may be radially moved therein by means of slots provided in the bolt F. A nearly circular spring I has the tendency to force the jaws E apart against the wall of the tightening sleeve D. The cap G thus forms a holder for the jaws and may be directly screwed out of the chuck body A without allowing the single elements to fall apart and every part of which may easily be reached.

According to the present invention a ball bearing is provided between the chuck body and the described arrangement for tightening the jaws E. The ball bearing consists of a ring B having an annular groove in which the balls C move, and the tightening sleeve D as shown in Figs. 1 and 3. Against the conical inner surface of the tightening sleeve D rest the jaws E with their correspondingly shaped outer surfaces.

When the cap G is screwed on, the jaws E are pressed by the conical inner surface of the tightening sleeve D toward the center and enter the axial boring H to grip there the tool K in a self-centering manner. After this has been done, according to Fig. 3, the tightening sleeve D is pressed against the balls C of the ball bearing by the working resistance. The balls C of the ball bearing thus prevent the friction on the chuck body A which otherwise is unavoidable and the self-tightening takes place. However it is also possible to tighten by hand every tool or drill as much as the work requires. This renders it possible to tighten securely only portions of short drills without risk of their being forced farther into the chuck by the working pressure.

The novel chuck further presents the advantage that after the introduction of the tool K only a slight tightening of the jaw holder F—G is necessary for the purpose of bringing the jaws E into contact with the tool shaft. The working resistance then further tightens the jaw holder in axial direction and the jaws E firmly grip the tool shaft. The tightening may also be done by hand in any desired manner. The release of the tool is effected in both instances by hand without great exertion.

I claim as my invention:

1. A self-tightening chuck, comprising a chuck body cylindrically bored out, a ball-bearing within, a tightening sleeve resting against the ball bearing and having an inner conical and a outer cylidrical surface, a cap on the chuck body, tightening jaws supported by said cap, and means for moving said jaws longitudinally, said sleeve being adapted to turn under the working resistance to cause said jaws to travel longitudinally with respect to said sleeve and said chuck body tightening said jaws.

2. A self-tightening chuck, comprising a chuck body cylindrically bored out, a ball bearing within, a tightening sleeve resting against the ball bearing and having an inner conical and an outer cylindrical surface, a cap on the chuck body, tightening jaws supported thereby, and an inner shank on said cap cylindrically bored out and having slots through which the jaws reach and coöperating means on said shank and said body to draw said jaws over the conical face of the tightening sleeve to tighten the same.

3. A self-tightening chuck for tools, comprising a chuck body cylindrically bored out, a ball bearing within, a tightening sleeve resting against the ball bearing and having an inner conical and an outer cylindrical surface, a cap on the chuck body, loose tightening jaws supported by the cap, a nearly circular spring connecting said jaws and tending to force them apart against the wall of the sleeve, and an inner central shank on said cap cylindrically bored out and having slots through which the jaws reach and coöperating means on said shank and said body to draw said jaws over the conical face of the tightening sleeve tighten the same.

4. A self-tightening chuck for tools, comprising a chuck body cylindrically bored out and having a right-handed thread in the narrow portion of the boring, a conical sleeve within, a ball bearing between the chuck body and the conical sleeve, tightening jaws with conical outer surfaces resting against the sleeve, and a cap having a threaded shank to engage the thread on the chuck body.

5. A self-tightening chuck for tools, comprising a chuck body cylindrically bored out and having a right-handed thread in the narrow portion of the boring, a conical tightening sleeve within, a ball bearing between the chuck body and the conical sleeve, conical jaws with outer conical surfaces resting against the conical sleeve, and an overlapping cap having a threaded shank engaging the thread of the chuck body and centrally bored out to receive a tool shaft.

6. A self-centering chuck for tools, comprising a chuck body with a central boring and narrow threaded inner portion, a tightening sleeve within the chuck body, a ball bearing between the chuck body and the tightening sleeve, tightening jaws within said sleeve, and a jaw supporting cap having a threaded shank centrally bored out and provided with slots through which the jaws reach.

Signed at Gera, Germany, this 10th day of June, 1910.

FRIEDRICH W. KUPKE.

Witnesses:
M. GÖPEL,
CHARLES NEUER.